P. O. HARDING.
SURVEYING INSTRUMENT.
APPLICATION FILED DEC. 14, 1920.
1,425,589.
Patented Aug. 15, 1922.
5 SHEETS—SHEET 1.
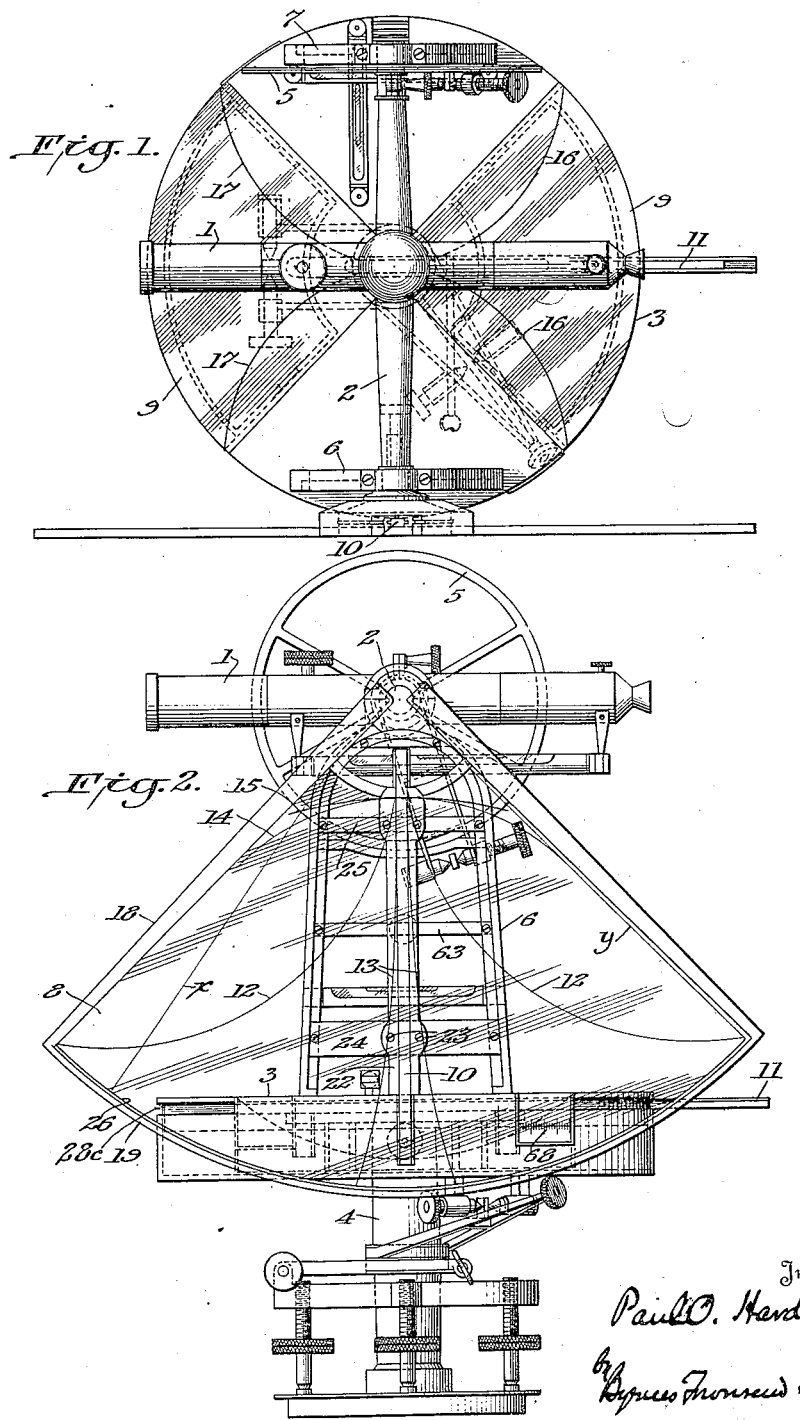

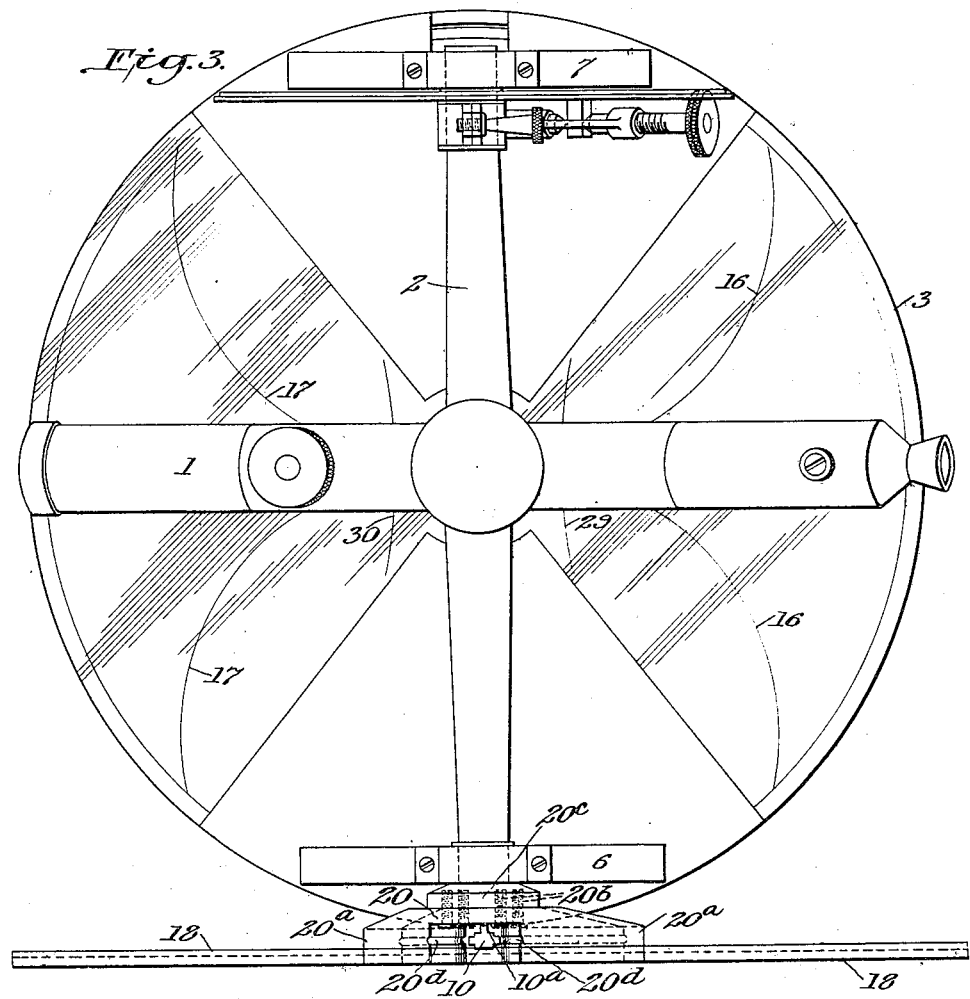
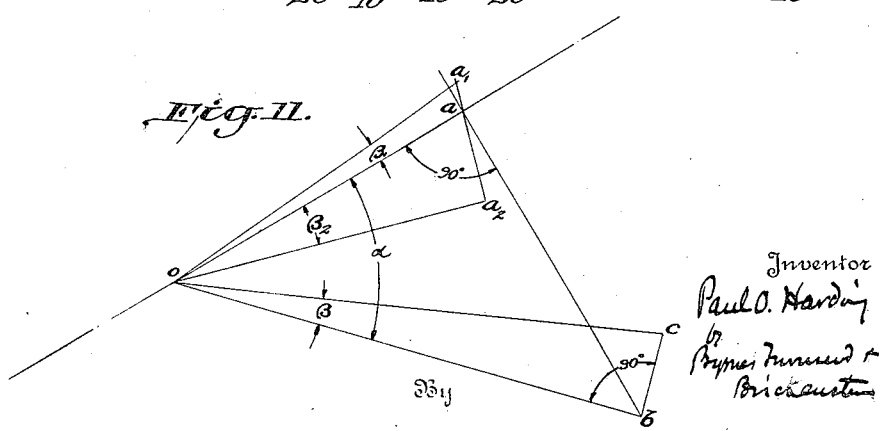

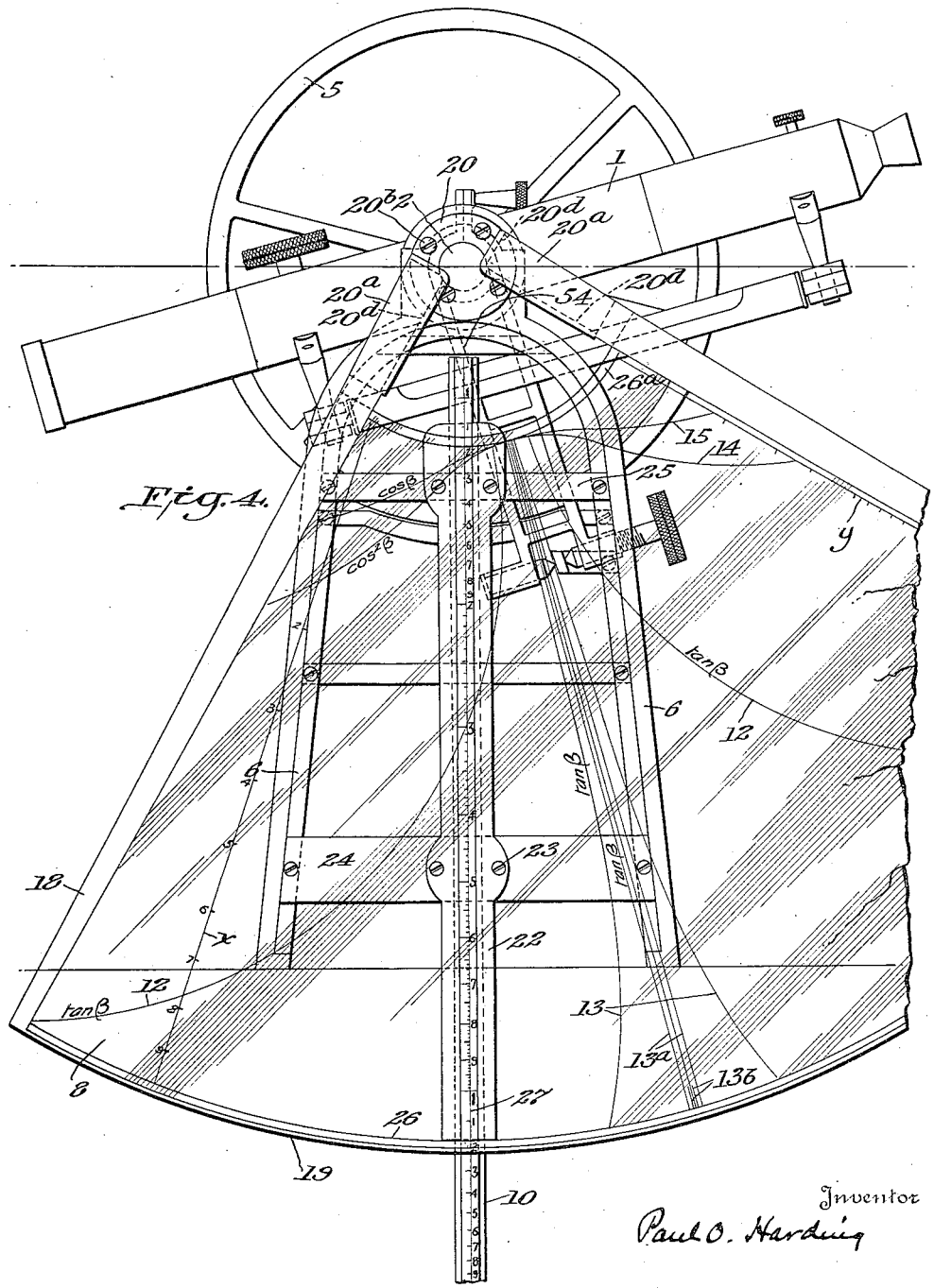

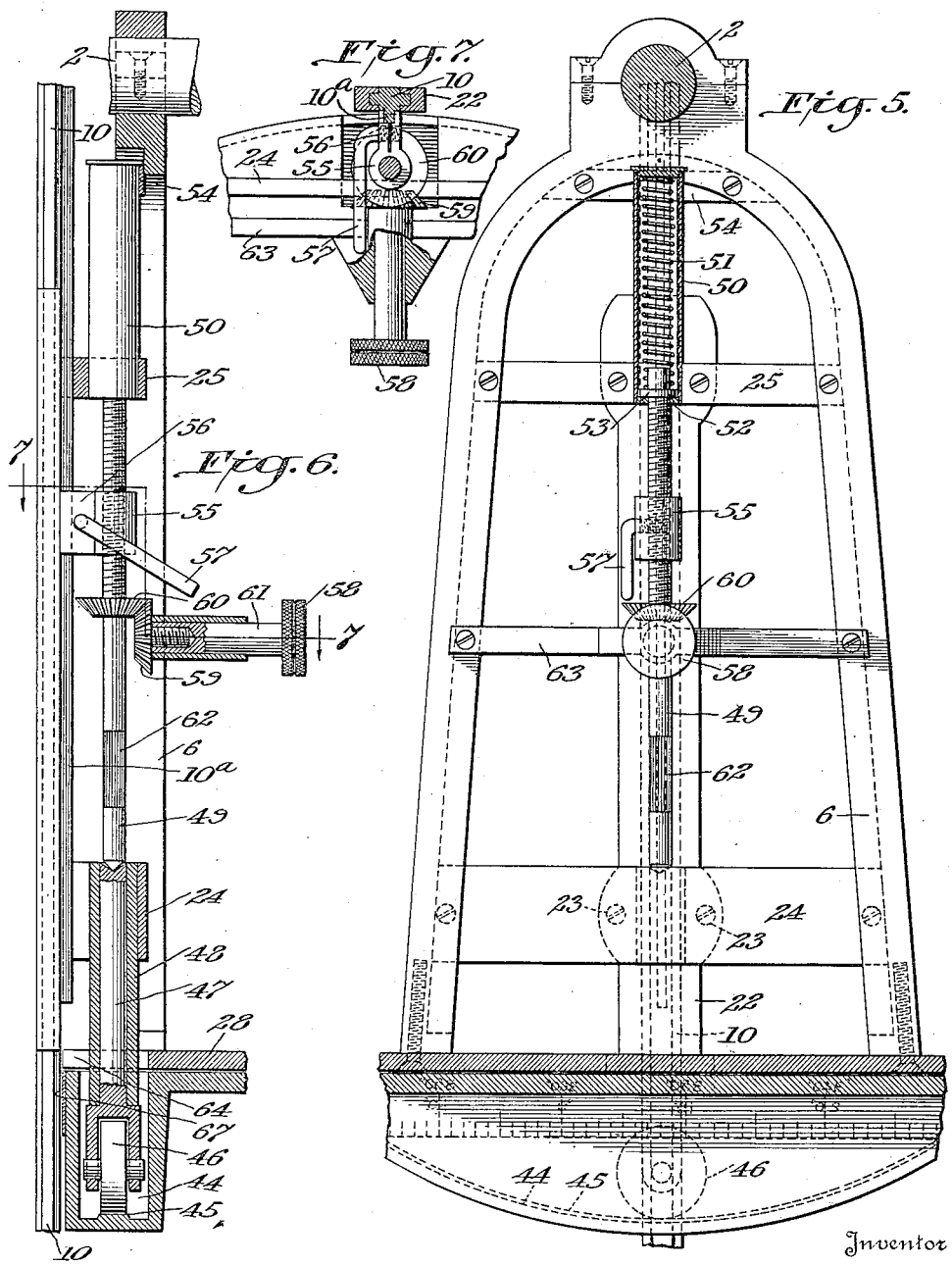

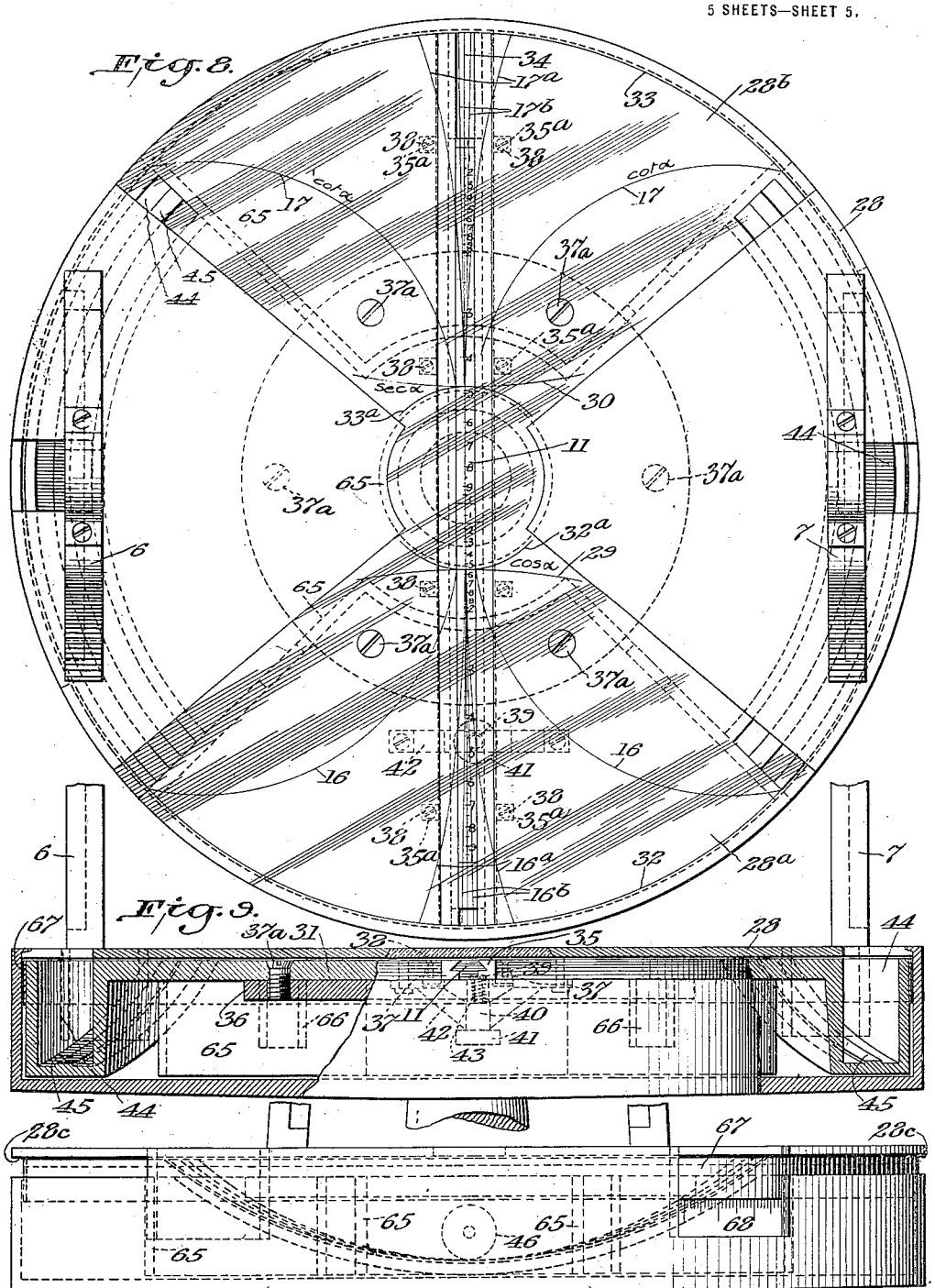

UNITED STATES PATENT OFFICE.

PAUL O. HARDING, OF CARLTON, OREGON.

SURVEYING INSTRUMENT.

1,425,589.   Specification of Letters Patent.   Patented Aug. 15, 1922.

Application filed December 14, 1920. Serial No. 430,778.

*To all whom it may concern:*

Be it known that I, PAUL O. HARDING, a citizen of the United States, residing at Carlton, in the county of Yamhill and State of Oregon, have invented certain new and useful Improvements in Surveying Instruments, of which the following is a specification.

The present invention relates to surveying instruments.

It is the general object of the invention to produce an engineer's universal field surveying instrument embodying means and mechanism for immediately and directly indicating the result of various triangulation operations.

A more specific object is to provide means for automatically translating various measuring movements of a surveying instrument and correlating them to directly indicate the result of a cycle of measuring operations.

In its more specific aspect, therefore, my invention comprises a surveying instrument and means connected with or operatively forming part of the instrument for translating various angular motions of the usual motion elements to directly indicate the final result of a complete cycle of operations.

The more specific nature of the invention will appear from the specification and the accompanying drawings forming part thereof and will be more particularly pointed out in the claims.

Having reference to the drawings,

Figs. 1 and 2 are a plan view and elevation respectively of a surveying instrument representing a preferred embodiment of the invention;

Figs. 3 and 4 are a plan view and elevation respectively, on a larger scale, of part of the instrument showing one distinct group of mechanism forming part of the invention;

Fig. 5 is a fragmentary view, partly in section, showing important detail mechanism;

Fig. 6 is a fragmentary view, partly in section, taken at right angle to that represented in Fig. 5;

Fig. 7 is a section on line 7—7, Fig. 6;

Fig. 8 is a plan view of another distinct group of mechanism, parts being omitted for the sake of clearness;

Fig. 9 is an elevation of the mechanism shown in Fig. 8;

Fig. 10 is an elevation of the same mechanism taken at right angle to that represented in Fig. 9; and Fig. 11 is a diagram explaining some of the functions of an instrument embodying the invention.

Figs. 1 and 2 show the general disposition and relationship of parts comprising the invention, as applied to one form of surveying device which includes the telescope 1 mounted on the horizontal axis 2 at the upper end of standards 6 and 7, the so called upper motion element generally referred to by the numeral 3, the lower motion element broadly indicated by the numeral 4, the vertical circle 5, the various well known elements for leveling the instrument and for determining horizontal lines of sight, the well known slow motion adjustments and in general, all features characterizing this form of engineer's field instrument.

The mechanism which is in this case identified with the invention includes a transparent plate 8 rigidly connected to the horizontal shaft or axis 2 and partaking of every movement thereof, a transparent plate or plates 9 forming part of the upper surface of the upper motion element 3, logarithmic slide scales 10 and 11 associated, respectively, with the plates 8 and 9, and various other elements omitted, for the sake of clearness, in Figs. 1 and 2.

The plates 8 and 9 bear hair line curves indicated for identification by the numerals 12, 13, 14, 15, 16 and 17 which will be described more in detail in connection with other figures of the drawings.

Now having reference to Figs. 3 and 4, the plate 8 is preferably supported by and may be shifted to a position of accurate adjustment within, a metallic frame including edge strips 18, a peripheral strip 19 and a connecting element for attaching the frame to the shaft 2.

While there is considerable latitude in making the connection, I prefer to use a plate 20 having projections 20$^a$ carrying the metallic frame. The plate 20 is attached as by screws 20$^b$ to a collar 20$^c$ which in turn is secured to the shaft 2. The lugs 20$^a$ are preferably rectangular and their faces are provided with grooves 20$^d$. The lugs 20$^a$ are spaced from each other to afford an unimpeded path for the scale 10 for all positions of the plate 8 within a range of 45° to both sides of the normal or zero position. In each of the limiting positions, if the scale should extend upwardly between the lugs 20ª, the grooves 20ᵈ will evenly engage the lateral ribs of the scale and prevent damage to the scale in case the telescope is thoughtlessly revolved beyond the 45° limit. Scale 10, if lowered till its upper end is flush with the upper end of its guides 22, will not engage lugs 20ª and the telescope 1 may be "transited" or revolved about axis 2 at will. In practice, however, the limit of 45° is rarely, if ever, reached.

The plate 8, in the particular form of the invention, is transparent so that the indicia in the form of hair lines thereon may be brought into fiducial relation with the logarithmic scale 10 which is supported upon the standard 6 in close proximity to the rear surface of the plate 8.

The scale 10, which structurally and operatively resembles the well known slide rule, is slidably mounted in a guide member 22 and so positioned that its central plane normally passes through the horizontal axis 2 of the telescope. The guide member 22 may be attached to the standard 6 in any suitable manner as by means of screws 23 to the brackets 24 and 25 extending transversely of the standard 6. In practice the arrangement is such that the guide 22 may be accurately adjusted for the slide scale so that it will properly and accurately function with the indicia hair lines.

As is clearly indicated in Fig. 4, the plate 8 bears hair line curves 12, 13, 13ª, 14 and 15 mentioned in connection with Fig. 2 and interpolation lines 13ᵇ.

The functional significance and operation of these curves will be explained at a later stage of the specification. It may be mentioned, however, at this point that the curves 12, 13 and 13ª are plotted for the logarithmic values of tan $\beta$ and interpolation lines 13ᵇ are for the purpose of quickly interpolating values between 0° and natural tan $\beta = .001$. Curves 14 are plotted for the logarithmic values of $\cos^2 \beta$ and curves 15 for the logarithmic values of $\cos \beta$, where $\beta$ represents the vertical angles through which the horizontal axis is moved upwardly and downwardly, respectively, from the horizontal position of the telescope as the starting point.

The curves are preferably etched upon the inner surface of the plate 8 to avoid errors due to parallax. The surface of the scale 10 and the plate 8 are brought into such close proximity to each other as is mechanically possible within the limits of expediency. The lower edge of the plate 8 defines the periphery of a circle about the axis 2 and adjacent this periphery is etched, likewise preferably on the inner surface of plate 8, a hair line 26 for use with the scale 10. Another and like hair line 26ª is formed relatively close to the axis 2. The scale 10 in turn has a fine central line 27 for cooperation with all hair lines to make an accurate reading or setting respectively of the scale 10 relatively to them feasible. Central line 27 facilitates adjustment of scale 10 and guides 22.

Having now reference to Fig. 8 it will be observed that the plate 28, which is part of the upper motion element 3 previously referred to, bears curves 16, 17 above mentioned and curves 16ª, 16ᵇ, 17ª, 17ᵇ, 29 and 30. It may be noted at this time that the curves 16, 16ª and 16ᵇ are plotted for the logarithmic values of tan $\alpha$, while 17, 17ª and 17ᵇ for the logarithmic values of $\cos \alpha$, 29 for the values $\cos \alpha$ and 30 for the values $\sec \alpha$, where $\alpha$ represents angles in azimuth starting from the zero line and including approximately 45° in opposite directions, the zero line being that line which lies in the vertical plane through the telescope when the instrument is oriented for starting a triangulation operation.

The sections 28ª and 28ᵇ on which the aforementioned curves are marked are of glass or other suitable transparent material, as in the case of the plate 8, and the curves are etched or otherwise formed preferably upon the lower surface thereof to cooperate without danger of parallax with the slide scale 11 mounted immediately below it upon the plate 31 forming part of the so called lower motion member 4 previously mentioned.

The transparent sections 28ª and 28ᵇ also bear hair lines 32, 32ª and 33, 33ª respectively. These lines are arcs of circles with the vertical axis of the instrument as the center. These hair lines, like the hair lines 26 and 26ª are index lines, for cooperation with the scale 11 to accurately set it, the latter having a fine central line 34 corresponding to the line 27. Transparent sections 28ª and 28ᵇ are in practice adjustable to function accurately with scale 11.

The mounting of the scale 11 is, of course, a matter of judgment and there is, as in the case of scale 10, considerable latitude for making the necessary disposition of it. The arrangement, which I have found to be highly advantageous, appears clearly in Fig. 9.

The plate 31 has a portion cut away to receive the scale 11 and its guide strips 35. Practically, the plate 31 may consist of two complementary parts defining, when properly spaced, in substance a disk. These two parts are interconnected by a plate 36 secured to the lower surface thereof as by screws 37ª. The upper surface of the plate 36 is recessed to accommodate the guides 35. The plate 31 or the two parts composing it have preferably tapered facelets 37 to cooperate with tapered surfaces of the lugs 35ª which may be secured to the plate 31 by means of screws 38. Thus the scale 11 may be adjusted for accurate functioning with the indicia hair lines of transparent plates 28.

As appears from Figs. 2, 9 and 10, a part of the peripheral portion of the element 28 is cut away to provide a slot 28$^c$ extending through an angle of 45° each side of the zero position in the plane of movement of scale 11. The scale 11 may be moved along its sliding path by means of rack and gear mechanism including a rack on the scale 11 engaged by a gear 39 keyed or otherwise rigidly connected at the end of a pintle 40 which carries at its other end a knurled thumb wheel 41. The gear 39 and its pintle may be supported upon a bracket 42 attached to the plate 31. The pintle 40 is surrounded by a spring 43 bearing at one end upon gear 39 and at its other end upon the bracket 42 in which the pintle has bearing. By this arrangement a quick adjustment is afforded for the scale 11. When the gear is pulled downwardly against the tension of the spring 43 out of engagement with the rack, the scale may be moved by hand to approximately the intended position. Then the spring is released and the gear can again be brought into mesh with the rack and operated by means of the thumb wheel for accurate adjustment of the scale.

An important mechanism, the peculiar function of which will be clearly pointed out in connection with the statement of operation of the device as a whole, is what may be appropriately termed the "automatic setter". Its proximate function is to translate the horizontal angular motion of the telescope to automatically move the scale 10. The more particular function is to mathematically correlate the angular motion of the instrument about both its horizontal and its vertical axis and to thereby assist in the solution of a trigonometrical equation involving both of said angular motions.

This automatic setter mechanism is illustrated in detail in Figs. 5, 6 and 7 and part of the arrangement is shown also in Figs. 8, 9 and 10 which indicate its operative relation to the other parts of the instrument.

As appears best in Figs. 8, 9 and 10, the plate 31 of the lower motion element 4 has pits 44, on each side of the instrument, intermediate the sections 28$^a$ and 28$^b$ when the instrument is in zero adjustment. One of the pits and the elements associated with it is used during forward measurements from a common point of reference, to adapt the invention to the common and well established practice of running lines forward and backward.

Both pits and associated mechanism are identical and the description of one applies to the other.

The pits 44 extend along the periphery of the plate 31 an angle of approximately 90° or 45° each way from the vertical plane defined by the axis 2 when in zero position. The pits are deepest in the center from which the bottom rises toward the ends. On the upper motion element 28 is mounted a member which is connected with the scale 10 and extends through the plate 28 into the pit 44 into contact with the bottom thereof. When the upper motion element 3 is revolved relatively to the lower motion element 4, the bottom of the pit, therefore, acts as a cam to impart motion to the member and the scale 10. The bottom of the pit indeed represents a mathematical curve which moves the said member and the scale upwardly a distance which corresponds to the logarithmic value of a trigonometrical function of the horizontal angle through which the upper motion element has been turned about the lower motion element. The particular significance of this arrangement will appear later on.

The preferred form of mechanism for the purpose just mentioned includes a track 45, running along the center of the pit, for a wheel 46 which is pivotally mounted on the lower end of a shaft 47 free to slide in vertical direction but held against rotary motion by a guide member 48. In practice the shaft 47 may be clamped by a clamp, set screw or any other device so as to hold wheel 46 up to clear plate 31 and scale 11 when the upper motion is revolved more than 45° with respect to the lower motion, thus allowing the free use of the vertical axes with their angle measuring devices, where desired, without involving the automatic setter. This guide member 48 may be attached to the bracket 24 or held against angular movement relatively to the upper motion member in any suitable way, and in practice is adjustable to accurately and mathematically function.

Upon the upper end of shaft 47 is pivotally mounted a shaft 49. This shaft 49 has bearing at its upper end in a cylindrical casing 50 which contains a spring 51 normally holding the shaft 49 down upon shaft 47 and yieldingly resisting its upward motion. In practice the shaft 49 may be provided with a collar 52 a slight distance from its upper end and a washer 53 seated on the collar and loosely surrounding the shaft. Collar 52 bears against the tubular casing 50 and the spring 51 loosely fits over the extreme end of shaft 49 and exerts pressure against the washer 53. The casing 50 is secured to the brackets 25 and 54 of the standard 6.

The shaft 49 is screw-threaded at its upper portion to actuate a traveling nut 55 which carries a clamp 56 for detachably engaging the scale 10. The scale 10 has a rib 10$^a$ extending along its rear surface and the clamp 56 consists of two clamping jaws engaging the lateral surface of the rib. A clamping screw passes through the jaws and carries a lever 57 which may be weighted if desired. The arrangement is such that when the lever is lifted, the frictional contact between the rib and the clamping jaws is sufficiently decreased to permit their relative movement and that when the lever is released, its weight will cause a tightening of the screw to lock the jaws to the rib.

When it is desired to quickly adjust the scale 10, the lever 57 is lifted and the scale is moved approximately to the position desired. For accurately setting the scale 10 when the instrument is in its normal or zero position a thumb nut 58 may be turned, its motion being transmitted to the shaft 49 by means of beveled gears 59 and 60 and pintle 61 terminating in the thumb nut 58, the pintle being mounted on bracket 63. The shaft 49 also has a knurled or otherwise prepared portion 62 to facilitate the turning of the shaft 49 directly by hand, when the instrument is in a position other than zero.

It will be observed that the plate 28 has an opening 64 large enough to allow the wheel 46 to pass through it.

As indicated in Figs. 8, 9 and 10, but best shown in Fig. 8, the plate 31 has a depending wall portion 65 forming an enclosure to keep dust as much as possible from the inner parts. This wall portion 65 has openings 66 to allow the thumb wheel or nut 41 to pass through without interference when the upper motion is turned more than 45° either side of the center or base line with respect to the lower motion.

The numeral 67 in Figs. 8, 9 and 10 indicates one form of horizontal angle scale strip and 68 the vernier for reading the horizontal angles to the nearest minute.

The principal and most important of the curves is the tangent curve. The mathematical formula of the curve is $\rho = C + \log \tan \alpha \; (\beta)$. In this equation (polar) as applied to horizontal angles the pole O is the center of the vertical axes of the upper and lower motions. C is an arbitrary constant, e.g. 1 inch and equals the distance from the center of the vertical axis to the index line $32^a$. The curves are plotted from 0° to 45° as shown and include three distinct sections represented by the curves 16, $16^a$ and $16^b$ respectively (Fig. 8). The curve breaks with each characteristic of the logarithmic tangent. The breaking lines then are where the horizontal angle has values of 35′, 5°—45′ and 45°, the natural tangents of which are .01, .1 and 1 respectively. The origin of the first section of the curve is at the value $3\frac{1}{2}$′ where the natural tangent is .001. This being upon the 1 inch line above referred to and may be noted with a reading glass, but lateral distances smaller than this will never be encountered in practice.

It is thus seen that the logarithmic tangent of any horizontal angle may be laid off on the zero line or polar axis which is the center line 34 of the scale 11 upon which the logarithms of numbers are plotted to the same scale as the curves. The logarithmic scale 11 is graduated for two characteristics of logarithms so that some section of the curve is bound to intersect it without the necessity of sliding it through a whole characteristic. The distance between the index lines 32 and $32^a$ is here taken as 10 cm. which equals one characteristic.

The practical application of the scale 11 and the tan α curves is as follows, reference being had to Fig. 11.

Assume that it is intended to find the distance $ab$ which may be considered as a line at right angle to the line $oa$ in a horizontal plane $aob$. The distance $ab = oa \times \tan \alpha$, $oa$ being known. The $\log ab = \log oa + \log \tan \alpha$.

The instrument is oriented along the line $oa$ and the scale 11 is set with reference to line $32^a$ to indicate the distance $oa$. Since the scale 11 is graduated according to the logarithms of numbers, this setting sets off a length which equals the logarithm of the distance $oa$. Now the upper motion is turned and with it the curved hair lines. When the line of sight coincides with $b$, one of the three sections of the tan α curve sets off on scale 11 a second length which equals $\log \tan \alpha$. Thus the logarithms of the distance $oa$ and of the tangent of the horizontal angle α through which the line of sight has been turned are added and the point of intersection of the curved hair line indicates upon scale 11 the number which corresponds to this sum. We thus have measured $ab = oa \times \tan \alpha$ in the above equation.

By the same mode of operation vertical distances or elevations are measured. Thus $aa_1$ or $aa_2$ which may be considered as vertical distances from the horizontal line $oa$. By setting the vertical logarithmic scale 10 to set off the distance $oa$ and turning the line of sight through a vertical angle $\varepsilon_1$ or $\varepsilon_2$ respectively, the vertical distances $aa_1$ and $aa_2$ may be read off the scale 10.

It is evident to the expert that in this manner any distance may be found and directly read off, which equals the product of a known distance along the line of sight and the trigonometric function of an angle having its vertex at the instrument. We thus have directly at out disposal for cooperation with the logarithmic scales 10 and 11 the various trigonometric functions—sine, cosine, tangent, cotangent, secant, cosecant, $\cosine^2$ and $\secant^2$. Indirectly we have the $\sine^2$ from which the $\cosecant^2$ can be obtained.

The great advantage of this mode of determining vertical distance above or below a horizontal line is that from a single station the height, with a range of several hundred feet in elevation, of a number of stations may be found, forwardly as well as rearwardly, without the use of spirit leveling. The tedious expedients of "turns" up or down in hilly country are thus avoided. Also the often troublesome measurement along traverses on steep inclines is made unnecessary by the instrument so far described.

As advantageous as this phase of the new mode of measurement is, a correspondingly greater advantage is derived from the instrument in its use for determining vertical heights above or below the horizontal of points laterally of the base line.

Having again reference to Fig. 11, $c$ represents a point laterally of the base line $oa$ and $bc$ the vertical distance $c$ above the horizontal plane through $oa$. Then $aob$ is a horizontal plane and $cob$ is a vertical plane. The angle $aob$ may be called $\alpha$ and the angle $cob$ may be called $\beta$. Then $$\text{I}-ob = \frac{oa}{\cos\alpha} = oa \times \sec\alpha;$$
$$\text{II}-bc = ob \tan\beta = oa \times \sec\alpha \times \tan\beta;$$
$$\text{III}-\log bc = \log oa + \log \sec\alpha + \log \tan\beta;$$

From this equation $bc$ may be found.

In order to determine $bc$ directly with the instrument described, the instrument is first oriented along $oa$. In this position the telescope is in a horizontal position and the upper and lower motion members are in the position indicated in Fig. 8.

The scale 10 is now set according to the distance $oa$. This is accomplished by raising lever 57 to release the grip of the clamp 56 on the rib 10ª. Now by turning the thumb nut 58 the scale 10 may be set exactly to its position. The logarithm is set off above the mark 26ª.

The upper motion plate 28 is now turned until the vertical hair line of the telescope is in coincidence with the point $c$. As this turning movement takes place, the automatic setter is actuated and the scale 10 is lifted a distance equal to the logarithm of the secant of the horizontal angle $\alpha$ through which the upper motion member and telescope have been moved. It should be noted here that the mathematical curve represented by the bottom of the pit or rather by the track 45 is formed for that special purpose. Thus we have added log $oa$ and log sec $\alpha$ and the index circle 26ª will now cut scale 10 a distance below its upper end equal to the logarithm of $ob$, which could be read off, if desired.

Now the telescope is turned about axis 2 until the horizontal cross hair intersects the point $c$. As this movement takes place the curve 12, 13 or 13ª will intersect the central line 27 of the scale 10 a distance below the index line 26ª which equals the logarithm of tan $\beta$. Thus during the operation of the instrument as outlined the logarithms of $oa$, sec $\alpha$ and tan $\beta$ have been added to satisfy the equation III above mentioned.

The instrument has been primarily designed to simplify the usual tedious operations incident to any survey of an engineering project. It is intended principally for all sorts of topographical work, from the most accurate to the rougher stadia topography. It has been primarily designed to read at the instrument direct (with only the simplest mental computation for setting the scales 10 and 11) the elevation of any point with its lateral reference to the survey or base line. It requires but two men, an instrument man and a rod man, and these two men can perform the work of the usual level party of two men and of the topographical party of three men, much more accurately and quickly than by former methods. It thus saves labor, does its own computing, and increases the efficiency and accuracy of the party. I fully realize, however, that the principles upon which it is based may be even more generally applied to any triangulation work that may be involved in any engineering field work.

It is common practice to find horizontal distances from the instrument to a remote point by placing a stadia rod at the point and reading the rod intercept. The distance is obtained by multiplying the rod intercept by a constant (usually 100), providing the telescope was level. Where the telescope is either raised or depressed, the true horizontal distance very closely approximate equals the rod intercept indicated multiplied by $\cos^2 \beta$, $\beta$ being the vertical angle above or below the horizontal. By setting scale 10 on the $\cos^2 \beta$ hairline 14 to read the rod intercept while the instrument is sighted upon the rod, the true horizontal distance may be read at the index line 26 or 26ª and the elevation may be read directly upon scale 10 where the tan $\beta$ curve intersects it.

The lateral distance and distance along the base or survey line can then be found by setting scale 11 on the cos $\alpha$ line 29 to read the true horizontal distance above noted, by reading the tan $\alpha$ and index lines upon scale 11 respectively.

In the above only a few concrete examples have been given of the adaptability of the invention to various operations of triangulation. Various other operations may be carried out with the same facility involving other trigonometrical functions of vertical and horizontal angles.

While I have shown curved hair lines for the purpose of setting off the logarithms of trigonometrical functions and find the use of such curves simple and advantageous, I have also in mind other and different means for accomplishing the purpose. Thus the automatic setter mechanism represents a cam mechanism by which the log sec α has been added to the log oa. The result can be directly read off scale 10, if desired. Various cam mechanisms to operate with the vertical axes, with the horizontal axis or any other motion, and to operate in a vertical, horizontal or any other plane may be designed for moving an index mark along one of the scales a distance which corresponds to the logarithm of a trigonometrical function or for moving the scale with reference to an index mark as by an automatic setter. The selection of the various available means for carrying out the objects of the invention must be governed largely by the particular use to which the instrument is to be put.

In order to facilitate various mathematical computations such as may be necessary in the use of the instrument for the different triangulation operations and to render it a self-contained device for universal application, I have also provided hair lines $x$ and $y$ indicated in Figures 2 and 4. Like the curved lines mentioned they are etched upon the glass, near the opposite side edges.

The line $x$ is laid off at an angle of about 5° slant with the scale 10 so that the point of intersection therewith may be clearly observed and is used for multiplication and division. The scale 10 and the line $x$ are manipulated as any slide rule. The scale 10 is set so that one of the numbers is over the index circle 26$^a$ and then the glass plate is moved until the line $x$ at the point corresponding to the second number intersects the scale 10, when the product can be read off from scale 10. The operation for dividing takes place in the reverse order. The scale is moved upwardly until the dividend thereon coincides with the divisor on line $x$, when the result can be read off at the index circle.

The scale $y$ is used for obtaining squares and square roots. The number to be squared is set on scale 10 at the index mark. The square of the number is read at the end of scale 10 upon line $y$. The process is of course reversed for finding the square root.

The hair lines $x$ and $y$ form a very important auxiliary part of the instrument inasmuch as it makes the instrument absolutely self-contained. The transparent plate 8 has been utilized to provide the equivalent of a complete slide rule.

In the foregoing the term "surveying instrument" is not limited to the more restrictive specific meaning but is intended to include all instruments operating on the principle of angular relationship of points and according to the general principles of surveying instruments. I am well aware that the characteristic features of my invention may be readily embodied in various forms of instruments used for observation, orientation, range-finding, gun-laying etc.

In the claims, therefore, the term "surveying instrument" is used in the broad sense above defined.

I claim:—

1. In a surveying instrument including means for measuring angles, an adjustable scale indicating distances, means for setting the scale for any desired distance and means operatively connected to the first named means for indicating upon the scale any distance which is the function of an angle measured and the distance for which the scale is set.

2. In a surveying instrument including means for measuring angles, an adjustable scale indicating distances, means for setting the scale for any desired distance and means operatively connected to the first named means for indicating upon the scale any distance which is the product of the distance for which the scale is set and the tangent of an angle measured.

3. In a surveying instrument including means for measuring angles, an adjustable scale indicating distances, means for setting the scale for any desired distance and means operatively connected to the first named means for indicating upon the scale any distance which is the product of the distance for which the scale is set and the secant of an angle measured.

4. In a surveying instrument including means for measuring horizontal and vertical angles, an adjustable scale indicating distances, means for setting the scale for any desired distance and means operatively connected to the first named means for indicating upon the scale any distance which is the product of the trigonometrical function of a horizontal angle measured, a vertical angle measured and the distance for which the scale is set.

5. In a surveying instrument including means for measuring horizontal and vertical angles, an adjustable scale indicating distances, means for setting the scale for any desired distance and means operatively connected to the first named means for indicating upon the scale any distance which is the product of the distance for which the scale is set, the secant of a horizontal angle and the tangent of a vertical angle involved in the measurement.

6. In a surveying instrument including means for measuring angles, an adjustable logarithmic scale indicating distances, means for setting the scale for any desired distance, means defining a hair line shiftable relatively to the scale to variably intercept the same and means for moving the hair line and the scale relatively to each other to cause the hair line to indicate upon the scale any distance which is the product of a trigonometrical function of an angle measured and the distance for which the scale is set.

7. In a surveying instrument including means for measuring angles, an adjustable logarithmic scale indicating distances, means for setting the scale for any desired distance and means operatively connected to the first named means for setting off on the scale a value which equals the logarithm of a trigonometrical function of an angle measured, said latter means including a logarithmic curved hair line shiftable according to the angle measured.

8. In a surveying instrument, means for measuring angles, a logarithmic scale indicating distances, means for setting off on said scale any desired distance and means operatively connected to the first named means for setting off on said scale a length which equals the logarithm of a trigonometric function of the angle through which the line of sight has been turned.

9. In a surveying instrument including means for measuring angles, a logarithmic scale indicating distances, an indicator cooperating with the scale, the scale and the indicator being adjustable relatively to one another, and mechanism connected with the angle-measuring means for moving the scale and the indicator relatively to each other a length which corresponds to the logarithm of a trigonometrical function of an angle measured.

10. In a surveying instrument including means for measuring angles, a logarithmic scale indicating distances, an indicator cooperating with the scale, the scale and the indicator being adjustable relatively to one another, and mechanism connected with the angle-measuring means for moving the scale relatively to the indicator a length which corresponds to the logarithm of a trigonometrical function of an angle measured.

11. In a surveying instrument including means for measuring angles, a logarithmic scale indicating distances, an indicator cooperating with the scale, the scale and the indicator being adjustable relatively to one another, and mechanism connected with the angle-measuring means for moving the scale and the indicator relatively to each other a length which corresponds to the logarithm of a trigonometrical function of an angle measured, said mechanism including a cam element representing a mathematical curve.

12. In a surveying instrument including means for measuring angles, a logarithmic scale indicating distances, an indicator cooperating with the scale, the scale and the indicator being adjustable relatively to one another, and mechanism connected with the angle measuring means for moving the scale relatively to the indicator a length which corresponds to the logarithm of a trigonometrical function of an angle measured, said mechanism including a cam element representing a mathematical curve.

13. In a surveying instrument for measuring vertical and horizontal angles and including any form of upper and lower motion elements, a logarithmic scale movable in a vertical plane passing through the horizontal axis of the instrument, and mechanism on the upper and lower motion elements for moving the scale a distance which corresponds to the logarithmic value of a trigonometrical function of an angle defined by the relative movement of the upper and lower motion elements.

14. In a surveying instrument for measuring vertical and horizontal angles and including any form of upper and lower motion elements, a logarithmic scale movable in a vertical plane passing through the horizontal axis of the instrument, and means connected with the horizontal axis of the instrument for setting off on the scale a length which corresponds to the logarithmic value of a trigonometrical function of a vertical angle measured.

15. In a surveying instrument for measuring vertical and horizontal angles and including any form of upper and lower motion elements, a logarithmic scale movable in a vertical plane passing through the horizontal axis of the instrument, and mechanism on the upper and lower motion elements for moving the scale a distance which corresponds to the logarithmic value of the trigonometrical function of an angle defined by the relative movement of the upper and lower motion elements, said mechanism including a part on the lower-motion element defining a cam surface and a member on the upper-motion element having movement in the said vertical plane, said member cooperating at one end with the said cam surface and at the other end with the scale.

16. In a surveying instrument for measuring vertical and horizontal angles and including any form of upper and lower motion elements, a logarithmic scale movable in a vertical plane passing through the horizontal axis of the instrument, means defining a depressed cam surface on the lower motion element, a rod having sliding movement through the upper motion element and sliding contact with said cam surface and means for detachably connecting the upper end of the rod with the scale.

17. In a surveying instrument for measuring vertical and horizontal angles and including any form of upper and lower motion elements, a logarithmic scale movable in a vertical plane passing through the horizontal axis of the instrument, means defining a depressed cam surface on the lower motion element, a rod having sliding movement through the upper motion element and sliding contact with said cam surface, a second rod pivotally supported upon the upper end of the first rod and means for detachably connecting the second rod to the scale.

18. In a surveying instrument for measuring vertical and horizontal angles and including any form of upper and lower motion elements, a logarithmic scale movable in a vertical plane passing through the horizontal axis of the instrument, means defining a depressed cam surface on the lower motion element, a rod having sliding movement through the upper motion element and sliding contact with said cam surface, a second rod pvotally supported upon the upper end of the first rod, spring means for holding the second rod upon the first rod and means for detachably connecting the second rod to the scale.

19. In a surveying instrument for measuring vertical and horizontal angles and including any form of upper and lower motion elements, a logarithmic scale movable in a vertical plane passing through the horizontal axis of the instrument, means defining a depressed cam surface on the lower motion element, a rod having sliding movement through the upper motion element and sliding contact with said cam surface, a second rod pivotally supported upon the upper end of the first rod and screw threaded at its upper portion, spring means for holding the second rod upon the first rod, a nut having screw threaded engagement with the threaded portion of the second rod and means for detachably connecting the nut to the scale.

20. In a surveying instrument for measuring vertical and horizontal angles and including any form of upper and lower motion elements, a logarithmic scale movable in a vertical plane passing through the horizontal axis of the instrument, means defining a depressed cam surface on the lower motion element, a rod having sliding movement through the upper motion element and sliding contact with said cam surface, a second rod pivotally supported upon the upper end of the first rod and screw threaded at its upper portion, spring means for holding the second rod upon the first rod, a nut having screw threaded engagement with the threaded portion of the second rod and means for detachably connecting the nut to the scale, comprising a projecting rib on the scale and a clamp on the nut.

21. In a surveying instrument for measuring vertical and horizontal angles and including any form of upper and lower motion elements, a logarithmic scale movable in a vertical plane passing through the horizontal axis of the instrument, means on the upper and lower motion elements for moving the scale a distance which corresponds to the logarithmic value of a trigonometrical function of an angle defined by the relative movement of the upper and lower motion elements and means for setting off on the scale a length which corresponds to the logarithmic value of a trigonometrical function of a vertical angle measured.

22. In a surveying instrument for measuring vertical angles, a logarithmic scale movable in a vertical plane passing through the axis of the instrument, a transparent plate connected to the said axis and disposed in a normally vertical plane at right angle to the axis and in close proximity to the face of the scale, means on the surface of the plate defining hair lines, said hair lines being plotted to set off on the scale the logarithmic values of trigonometrical functions of angles measured.

23. In a surveying instrument for measuring horizontal angles, a logarithmic scale movably mounted in a normally horizontal plane, a transparent plate connected to the movable part of the angle-measuring mechanism and disposed in a normally horizontal plane immediately above the scale and means on the plate defining hair lines, said hair lines being plotted to set off on the scale the logarithmic values of trigonometrical functions of angles measured.

24. In a surveying instrument for measuring angles, a logarithmic scale movably mounted in the plane for measurement, an indicator and a slow motion mechanism for adjusting the scale relatively to said indicator.

25. In a surveying instrument for measuring angles, a logarithmic scale movably mounted in a plane for measurement, an indicator, a slow motion mechanism for adjusting the scale and means for disconnecting the mechanism, at will, from the scale.

26. In a surveying instrument for measuring angles, a logarithmic scale movably mounted on the instrument, a transparent plate pivotally mounted for movement in the plane of motion of the said scale and in superposition therewith, and means on the plate defining a scale for co-operation with the first scale to carry out arithmetical computations.

27. In a surveying instrument for measuring angles, a logarithmic scale movably mounted on the instrument, a transparent plate pivotally mounted for movement in the plane of motion of the said scale and in superposition therewith, and means on the plate defining two separate scales for co-operation with the first scale, one of said last mentioned scales being adapted for multiplication and division and the other for finding squares and square roots.

In testimony whereof, I affix my signature.

PAUL O. HARDING.